US012163442B2

(12) United States Patent
Holleran

(10) Patent No.: US 12,163,442 B2
(45) Date of Patent: Dec. 10, 2024

(54) SHROUD PIN FOR GAS TURBINE ENGINE SHROUD

(71) Applicant: General Electric Company, Schenectady, NY (US)

(72) Inventor: Mark Anthony Holleran, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/465,514

(22) Filed: Sep. 12, 2023

(65) Prior Publication Data

US 2023/0417159 A1 Dec. 28, 2023

Related U.S. Application Data

(62) Division of application No. 17/713,515, filed on Apr. 5, 2022, now Pat. No. 11,781,448.

(51) Int. Cl.

*F01D 11/08* (2006.01)
*F01D 25/00* (2006.01)
*F01D 25/08* (2006.01)
*F01D 25/28* (2006.01)

(52) U.S. Cl.

CPC .............. *F01D 25/28* (2013.01); *F01D 11/08* (2013.01); *F01D 25/005* (2013.01); *F05D 2240/11* (2013.01); *F05D 2260/36* (2013.01); *F05D 2300/6033* (2013.01)

(58) Field of Classification Search

CPC ........... F01D 11/08; F01D 25/24; F01D 25/28
See application file for complete search history.

(56) References Cited

U.S. PATENT DOCUMENTS

| | | | |
|---|---|---|---|
| 3,099,057 | A | 7/1963 | Cook |
| 4,363,580 | A | 12/1982 | Bell |
| 5,688,093 | A | 11/1997 | Bowers |
| 5,690,460 | A | 11/1997 | Attanasio |
| 7,530,629 | B2 | 5/2009 | King et al. |
| 7,874,779 | B2 | 1/2011 | Csik et al. |
| 8,475,098 | B2 | 7/2013 | Marlow et al. |
| 8,506,224 | B2 | 8/2013 | Cosenza et al. |
| 8,596,941 | B2 | 12/2013 | Marlow et al. |
| 8,647,036 | B2 | 2/2014 | Haylock et al. |
| 8,740,530 | B2 | 6/2014 | Cosenza et al. |

(Continued)

*Primary Examiner* — Long T Tran
(74) *Attorney, Agent, or Firm* — Dority & Manning, P.A.

(57) ABSTRACT

A shroud assembly is provided for a gas turbine engine defining an axial direction, a radial direction, and a circumferential direction. The shroud assembly includes: a shroud segment extending substantially along the circumferential direction and including a shroud wall, the shroud wall defining a shroud attachment opening; a hanger assembly including a hanger wall defining a hanger attachment opening; and an attachment pin assembly including a first member defining an interference fit with the hanger wall through the hanger attachment opening and including a shoulder contacting the hanger wall, the first member further extending through the shroud attachment opening and defining a hollow core; and a second member extending through the hollow core of the first member, the second member extending between a first end and a second end, the second member including a rim at the first end and a secondary attachment member at the second end.

20 Claims, 5 Drawing Sheets

(56) References Cited

U.S. PATENT DOCUMENTS

| | | | | |
|---|---|---|---|---|
| 11,021,990 | B2 | 6/2021 | Filippi | |
| 2005/0158168 | A1* | 7/2005 | Bruce | F01D 25/08 415/173.1 |
| 2013/0011253 | A1* | 1/2013 | Mulcaire | F01D 25/265 415/214.1 |
| 2014/0314550 | A1* | 10/2014 | Jenkinson | F01D 9/042 29/889.21 |
| 2015/0345335 | A1* | 12/2015 | Kockenpo | F01D 9/065 415/116 |
| 2016/0186611 | A1* | 6/2016 | Vetters | F01D 25/246 415/173.2 |
| 2016/0376921 | A1* | 12/2016 | O'Leary | F01D 11/08 415/116 |
| 2019/0112947 | A1* | 4/2019 | Walston | F01D 25/246 |
| 2019/0169990 | A1* | 6/2019 | Chaboud | F01D 5/066 |
| 2019/0264572 | A1* | 8/2019 | Walston | F01D 11/08 |
| 2019/0284958 | A1* | 9/2019 | Schilling | F01D 25/246 |
| 2021/0108532 | A1 | 4/2021 | Freeman et al. | |

* cited by examiner

SHROUD PIN FOR GAS TURBINE ENGINE SHROUD

PRIORITY INFORMATION

This present application claims priority to, and is a divisional application of, U.S. patent application Ser. No. 17/713,515 filed on Apr. 5, 2022, which is incorporated by reference herein in its entirety for all purposes.

FEDERALLY SPONSORED RESEARCH

This invention was made with government support under contract number FA8626-16-C-2138 awarded by the Department of Defense. The U.S. government may have certain rights in the invention.

FIELD

The present subject matter relates generally to gas turbine engines. More particularly, the present subject matter relates to shroud assemblies for gas turbine engines.

BACKGROUND

Gas turbine engine performance and efficiency can be improved by increased combustion gas temperatures. However, increased combustion temperatures can negatively impact gas turbine engine components, for example, by increasing the likelihood of material failures. Accordingly, high temperature materials, such as ceramic matrix composite (CMC) materials, are being used for various components of the engine. In particular, shroud assemblies defining an outer boundary of the working gas flowpath of the engine and circumferentially enclosing the rotor blades of various compressor and/or turbine stages of an engine can be formed of CMC material. For example, a shroud segment may be formed of a SiC/Si—SiC (fiber/matrix) CMC material.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
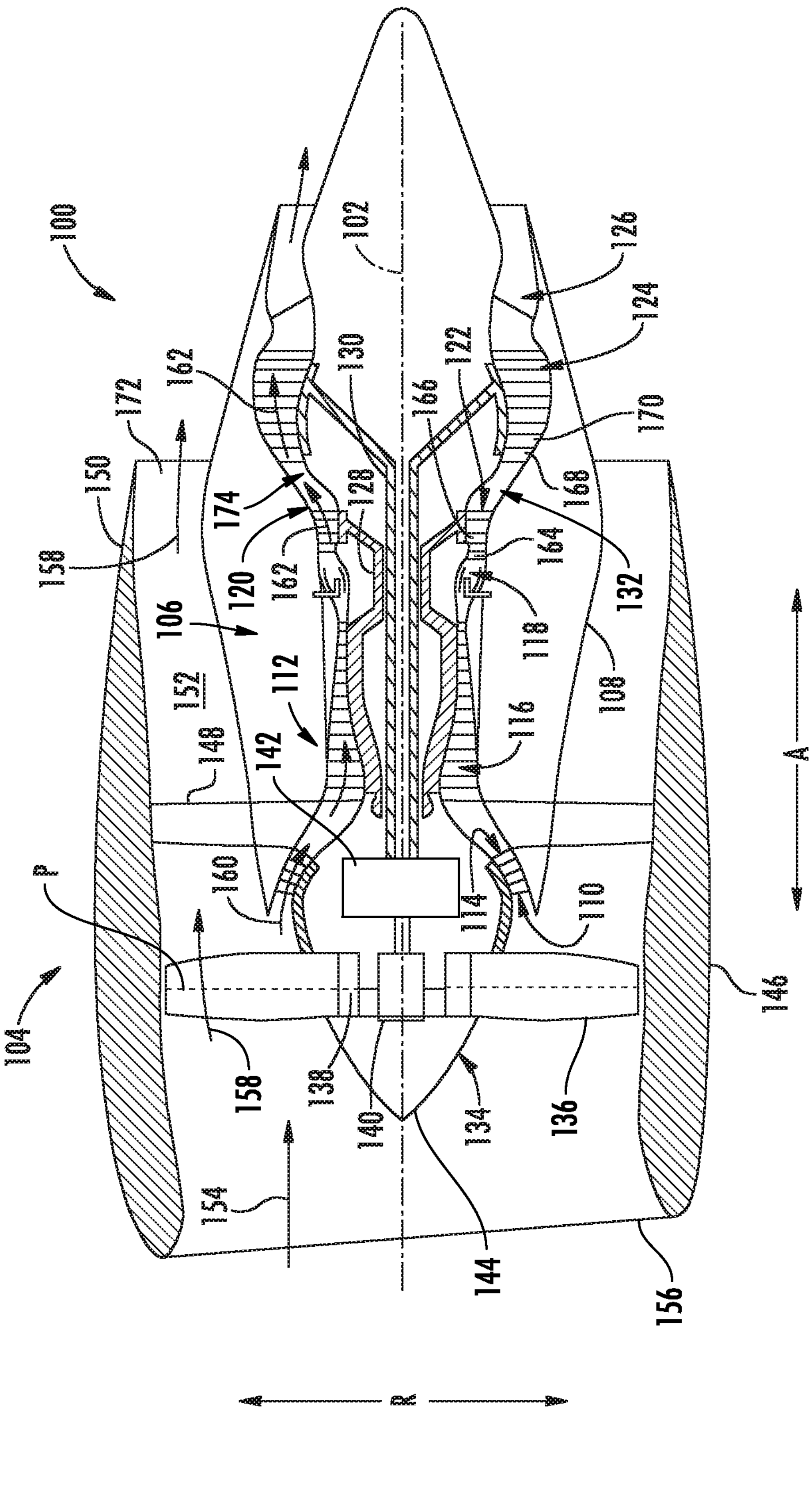
FIG. 1 is a schematic cross-sectional view of an exemplary gas turbine engine according to various embodiments of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof)

and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Despite the use of CMC materials for some components of shroud assemblies, shroud assemblies may include mounts (such as hangers) formed of other materials. A thermal expansion mismatch between the mounts and the shroud segments may require relatively complex and large mounts that take up more room than desired in the engine and add additional weight and cost to the engine. Therefore, an improved shroud assembly for a gas turbine would be desirable.

The present disclosure is generally related to a shroud assembly for a gas turbine engine defining an axial direction, a radial direction, and a circumferential direction. The shroud assembly includes a shroud segment extending substantially along the circumferential direction and comprising a shroud wall. The shroud wall defines a shroud attachment opening. The shroud assembly further includes a hanger assembly having a hanger wall defining a hanger attachment opening, and an attachment pin assembly. The attachment pin assembly includes a first member defining an interference fit with the hanger wall through the hanger attachment opening. The first member includes a shoulder contacting the hanger wall, extends through the shroud attachment opening, and defining a hollow core.

The attachment pin assembly further includes a second member extending through the hollow core of the first member. The second member extends between a first end and a second end, the second member including a rim at the first end and a secondary attachment member at the second end. For example, the rim may define a diameter larger than a diameter of the hanger attachment opening, and the secondary attachment member may define a diameter greater than a diameter of the hollow core.

In such a manner, the attachment pin assembly may include a dual attachment configuration with less complexity and weight than previous designs. For example, the attachment pin assembly includes a first attachment through the interference fit between the first member and the hanger wall, and a second attachment through a compression between the shoulder of the first member and the rim of the second member.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A (extending parallel to or coaxial with a longitudinal centerline 102 provided for reference), a radial direction R, and a circumferential direction C (i.e., a direction extending about the axial direction A; see FIG. 3). In general, the gas turbine engine 100 includes a fan section 104 and a turbomachine 106 disposed downstream from the fan section 104.

The exemplary turbomachine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. A HP shaft or spool 128 drivingly connects the HP turbine 122 to the HP compressor 116. A LP shaft or spool 130 drivingly connects the LP turbine 124 to the LP compressor 114. The compressor section, combustion section 118, turbine section, and jet exhaust nozzle section 126 together define a working gas flowpath 132 through the turbomachine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable front nacelle 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the turbomachine 106. Moreover, for the embodiment depicted, the nacelle 146 is supported relative to the turbomachine 106 by a plurality of circumferentially spaced outlet guide vanes 148. Further, a downstream section 150 of the nacelle 146 extends over an outer portion of the turbomachine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the high pressure (HP) compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the turbomachine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the turbomachine 106.

It will be appreciated that the exemplary gas turbine engine 100 depicted in FIG. 1 is by way of example only, and that in other exemplary embodiments, the gas turbine engine 100 may have any other suitable configuration. For example, the gas turbine engine may include any suitable number and/or configuration of compressors, turbines, shafts or spools, etc. Further, although depicted as including a variable pitch fan 124 and a power gear box 142, in other embodiments, the gas turbine engine may include a fixed pitch fan, a direct drive configuration, etc. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engines, such as a power generation gas turbine engine, or any aeroderivative gas turbine engine, such as a nautical gas turbine engine.

Figure 2:
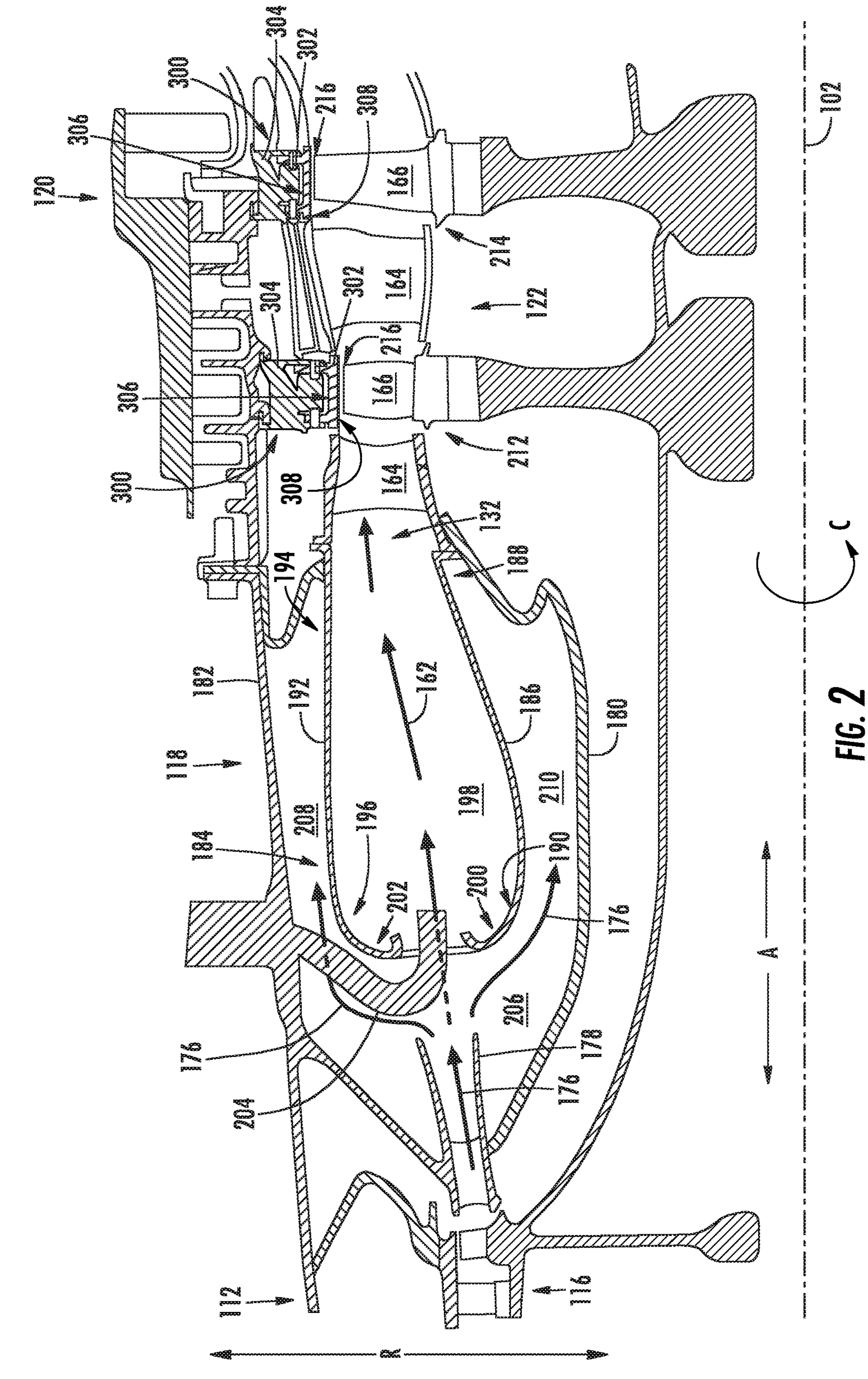
FIG. 2 is a cross-sectional view of a compressor section, a combustion section, and a high pressure turbine section of the gas turbine engine shown in FIG. 1.

Referring now to FIG. 2, FIG. 2 provides a side cross-sectional view of the compressor section 112, combustion section 118, and the turbine section 120 of the turbomachine 106 of FIG. 1. More specifically, the rear end of the HP compressor 116, the combustor section 118, and the forward end of the HP turbine 122 are illustrated.

Compressed air 176 exits the HP compressor 116 through a diffuser 178 located at the rear end or outlet of the HP compressor 116 and diffuses into the combustion section 118. The combustion section 118 of turbomachine 106 is annularly encased by radially inner and outer combustor casings 180, 182. The radially inner combustor casing 180 and the radially outer combustor casing 182 both extend generally along the axial direction A and surround a combustor assembly 184 in annular rings. The inner and outer combustor casings 180, 182 are joined together at annular diffuser 178 at the forward end of the combustion section 118.

As shown, the combustor assembly 184 generally includes an inner liner 186 extending between a rear end 188 and a forward end 190 generally along the axial direction A, as well as an outer liner 192 also extending between a rear end 194 and a forward end 196 generally along the axial direction A. The inner and outer liners 186, 192 together at least partially define a combustion chamber 198 therebetween. The inner and outer liners 186, 192 are each attached to or formed integrally with an annular dome. More particularly, the annular dome includes an inner dome section 200 formed integrally with the forward end 190 of the inner liner 186 and an outer dome section 202 formed generally with the forward end 196 of the outer liner 192. Further, the inner and outer dome section 200, 202 may each be formed integrally (or alternatively may be formed of a plurality of components attached in any suitable manner) and may each extend along the circumferential direction C to define an annular shape. It should be appreciated, however, that in other embodiments, the combustor assembly 184 may not include the inner and/or outer dome sections 200, 202; may include separately formed inner and/or outer dome sections 200, 202 attached to the respective inner liner 186 and outer liner 192; or may have any other suitable configuration.

Referring still to FIG. 2, the combustor assembly 184 further includes a plurality of fuel air mixers 204 spaced along the circumferential direction C and positioned at least partially within the annular dome. More particularly, the plurality of fuel air mixers 204 are disposed at least partially between the outer dome section 202 and the inner dome section 200 along the radial direction R. Compressed air 176 from the compressor section 112 of the gas turbine engine 100 flows into or through the fuel air mixers 204, where the compressed air 176 is mixed with fuel and ignited to create combustion gases 162 within the combustion chamber 198. The inner and outer dome sections 200, 202 are configured to assist in providing such a flow of compressed air 176 from the compressor section 112 into or through the fuel air mixers 204.

As discussed above, the combustion gases 162 flow from the combustion chamber 198 into and through the turbine section 120 of the gas turbine engine 100, where a portion of thermal and/or kinetic energy from the combustion gases 162 is extracted via sequential stages of turbine stator vanes and turbine rotor blades within the HP turbine 122 and LP turbine 124. More specifically, as is depicted in FIG. 2, combustion gases 162 from the combustion chamber 198 flow into the HP turbine 122, located immediately downstream of the combustion chamber 198, where thermal and/or kinetic energy from the combustion gases 162 is extracted via sequential stages of HP turbine stator vanes 164 and HP turbine rotor blades 166.

As illustrated in FIG. 2, not all compressed air 176 flows into or directly through the fuel air mixers 204 and into combustion chamber 198. Some of the compressed air 176 is discharged into a plenum 206 surrounding the combustor assembly 184. Plenum 206 is generally defined between the combustor casings 180, 182 and the liners 186, 192. The outer combustor casing 182 and the outer liner 192 define an outer plenum 208 generally disposed radially outward from the combustion chamber 198. The inner combustor casing 180 and the inner liner 186 define an inner plenum 210 generally disposed radially inward with respect to the combustion chamber 198. As compressed air 176 is diffused by diffuser 178, some of the compressed air 176 flows radially outward into the outer plenum 208 and some of the compressed air 176 flows radially inward into the inner plenum 210.

The compressed air 176 flowing radially outward into the outer plenum 208 flows generally axially to the turbine section 120. Specifically, the compressed air 176 flows above the HP turbine stator vanes and rotor blades 164, 166. The outer plenum 208 may extend to the LP turbine 124 (FIG. 1) as well.

As further shown in FIG. 2, the HP turbine 122 includes one or more shroud assemblies 300, each of which forms an annular shroud ring about an annular array of HP turbine rotor blades 166. In this example, an annular shroud ring is circumferentially disposed around the annular array of rotor blades 166 of a first stage 212 of HP turbine 122, and an annular ring is circumferentially disposed around the annular array of turbine rotor blades 166 of the second stage 214. In general, the shrouds or shroud segments of the shroud assemblies 300 are radially spaced from blade tips 216 of each of the rotor blades 166. The shroud assemblies 300 generally reduce radial leakage into and out of the working gas flowpath 132 and may also reduce axial leakage.

Each shroud assembly 300 includes a shroud segment 302 and a hanger assembly 304. The shroud segment 302 is positioned radial outward from blade tips 216 of each of the rotor blades 166 and at least partially defines the working gas flowpath 132. Each shroud segment 302 includes an outer side 306 along the radial direction R and an inner side 308 along the radial direction R. The inner side 308 of each shroud segment 302 may include, e.g., a ceramic-based abradable material coated with an environmental barrier coating (EBC). Alternatively, however, in other embodiments, any other suitable material and/or coating may be provided on the inner side 308 of the shroud segment 302. Further, as will be explained in greater detail below, each shroud segment 302 is coupled to a corresponding hanger assembly 304. The hanger assemblies 304 couple each shroud segment 302 to a structural component of the turbomachine 106, and more specifically, to the outer casing 182 for the embodiment shown.

It should be noted that shroud assemblies 300 may additionally be utilized in a similar manner in the LP compressor 114, HP compressor 116, and/or LP turbine 124. Accordingly, the shroud assemblies 300 as disclosed herein are not limited to use in HP turbines 122, and rather may be utilized in any suitable section of gas turbine engine 100 or turbine engine more generally.

As will be explained in greater detail below with reference to, e.g., FIG. 4, the shroud segment 302 and hanger assembly 304 each generally extends along the circumferential direction C (see FIG. 2). The shroud assembly 300 may generally include a plurality of individuals shroud segments 302 and hanger assemblies 304 sequentially arranged along the circumferential direction C to collectively form a circumferential shroud assembly 300.

Figure 3:
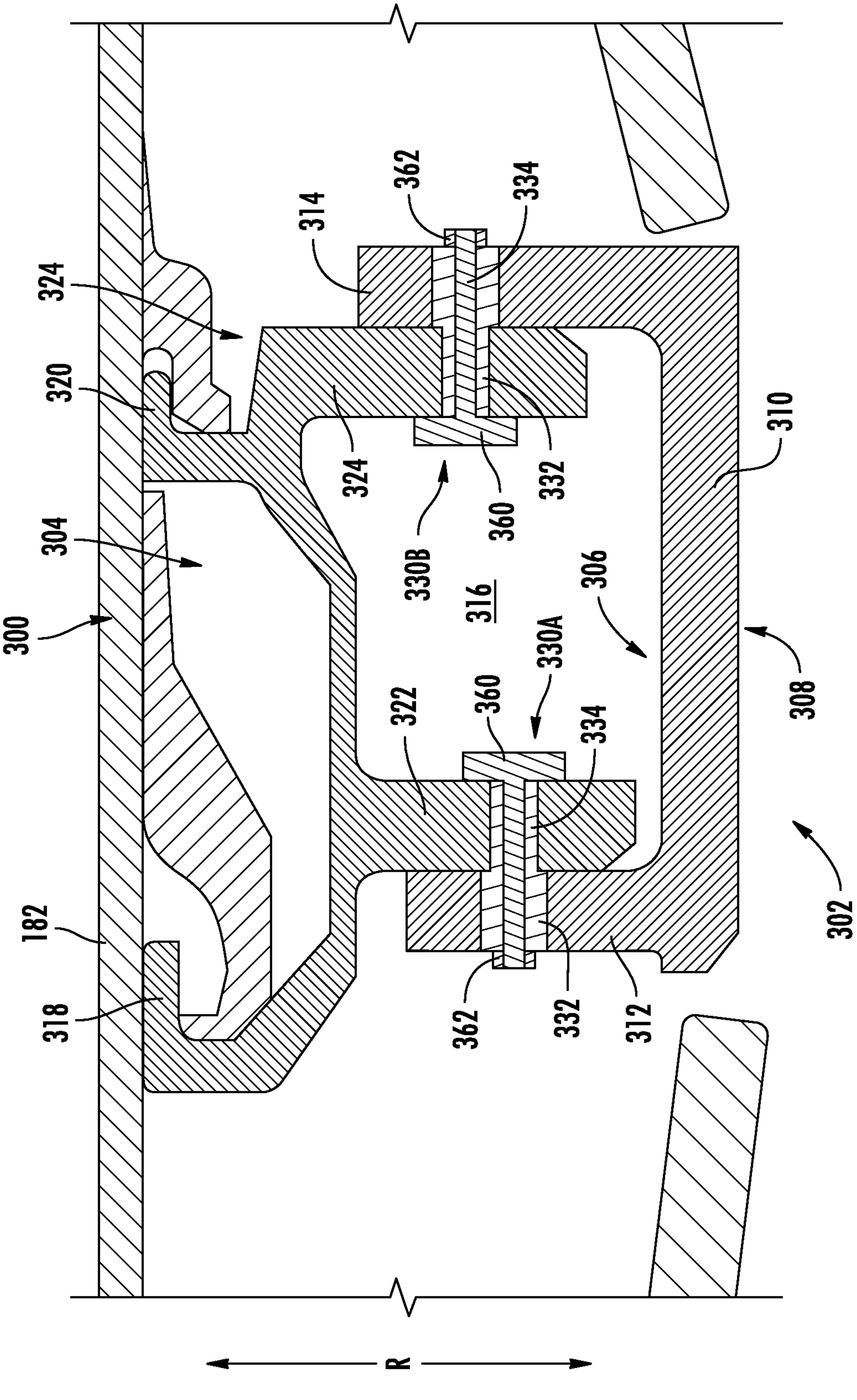
FIG. 3 is a partial side, cross-sectional view of the shroud assembly of FIG. 2 including an attachment pin assembly in accordance with an exemplary aspect of the present disclosure.

Referring now also to FIG. 3, the shroud assembly 300 will be further explained in greater detail. More specifically, FIG. 3 provides a close-up, schematic view of the shroud assembly 300 installed within the gas turbine engine.

The shroud segment 302 generally includes a shroud body 310 defining the outer side 306 and inner side 308, with the inner side 308 defining at least in part the working gas flowpath 132 (see FIGS. 1 and 2) of the gas turbine engine. Further, the shroud segment 302 includes a forward shroud wall 312 and an aft shroud wall 314 spaced along the axial direction A from one another and together defining a cavity 316 therebetween. Notably, each of the forward shroud wall 312 and aft shroud wall 314 extend outwardly from the shroud body 310 generally along the radial direction R, and further extend generally along the circumferential direction C (see FIG. 2) with the shroud body 310.

Briefly, it will be appreciated that the cavity 316 is further defined by the hanger assembly 304. During operation, the cavity 316 may be fed with cooling air coming from the compressor section that bypassed the combustor, e.g., through the outer plenum 208 (see FIG. 2). This air may cool the shroud segment 302 and the hanger assembly 304 and is usually at a pressure larger than the flowpath gas. For example, the pressure of the cavity 316 may increase with engine operating speeds as the air is received from the compressor section (and the compressor section produces higher pressure air at higher rotational speeds). Such a configuration may help prevent the hot flowpath gas from seeping radially outward into the hanger assembly 304 and/or shroud segment 302 (e.g., shroud assembly cavities 316), potentially damaging such components. Sealing is therefore required between shroud segment 302 and the hanger assembly 304 to prevent this cooling air within the cavity 316 from escaping into the flowpath in uncontrolled manner.

Referring still to FIG. 3, the hanger assembly 304 is coupled to the shroud segment 302 and is further configured to mount the shroud segment 302 within the gas turbine engine to, e.g., a structural component of the gas turbine engine (such as an outer casing 182, as noted above with reference to FIG. 2). More specifically, the hanger assembly 304 includes a hanger attachment configured to attach the hanger assembly 304 to a structural member of the gas turbine engine, and more specifically still, includes a forward hanger attachment 318 and an aft hanger attachment 320. For the embodiment shown, the forward hanger attachment 318 and aft hanger attachment 320 are each configured as hooks. However, in other exemplary embodiments any other suitable mechanical fastener may be used (e.g., bolts, screws, etc.).

More particularly, for the embodiment of FIG. 3, the forward hanger attachment 318 and aft hanger attachment 320 are coupled to the structural member of the gas turbine engine, and more specifically, to the casing 182 of the gas turbine engine, mounting the shroud assembly 300 within the gas turbine engine.

Further, the hanger assembly 304 generally includes a forward hanger wall 322 and an aft hanger wall 324. For the embodiment depicted, the forward hanger wall 322 is coupled to the forward shroud wall 312 and the aft hanger wall 324 is coupled to the aft shroud wall 314. In particular, for the exemplary embodiment of FIG. 3, the forward hanger wall 322 is coupled to the forward shroud wall 312 using a first attachment pin assembly 330A. The first attachment pin assembly 330A generally includes a first member 332 and a second member 334, and may provide for a dual redundant mechanical attachment of the forward hanger wall 322 to the forward shroud wall 312. Similarly for the embodiment depicted in FIG. 3, the aft hanger wall 324 is coupled to the aft shroud wall 312 using a second attachment pin assembly 330B. The second attachment pin assembly 330B also generally includes a first member 332 and a second member 334, and may provide for a dual redundant mechanical attachment of the aft hanger wall 324 to the aft shroud wall 314.

Figure 4:
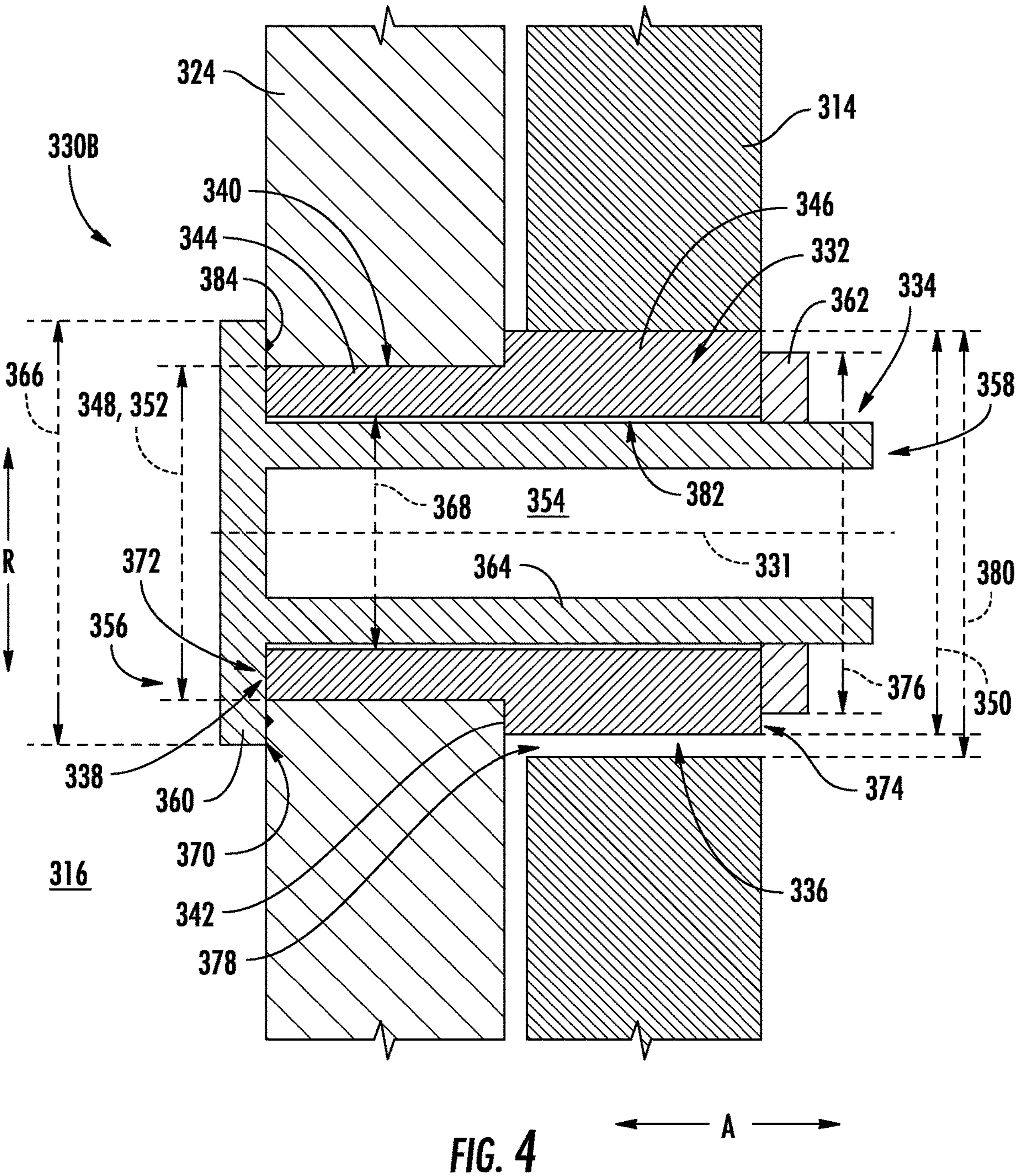
FIG. 4 is a close-up view of the shroud assembly and attachment pin assembly of FIG. 3.

More specifically, referring also to FIG. 4, a close-up, cross-sectional, schematic view of the second attachment pin assembly 330B coupling the aft hanger wall 324 to the aft shroud wall 314 is provided. The pin assembly 330 extends generally along a longitudinal axis 331.

As noted, the second attachment pin assembly 330B includes the first member 332 and the second member 334. The aft shroud wall 314 defines a shroud attachment opening 336, and the aft hanger wall 324 assembly defines a hanger attachment opening 338.

The first member 332 includes a body having a first segment 344 and a second segment 346. Moreover, the first member 332 includes the shoulder 342 between the first segment 344 and the second segment 346. More specifically, the first segment 344 defines a first segment diameter 348, the second segment 346 defines a second segment diameter 350, and the aft hanger wall 324 defines a hanger attachment opening diameter 352. Notably, the first segment diameter 348 may be substantially equal to the hanger attachment opening diameter 352 to facilitate an interference fit 340 as described below. The second segment diameter 350 is greater than the first segment diameter 348, and further is greater than the hanger attachment opening diameter 352. In such a manner, the shoulder 342 may prevent the second segment 346 of the first member 332 from being inserted through the hanger attachment opening 338 (inserted from right to left in the view of the embodiment in FIG. 4).

When inserted into the hanger attachment opening 338 of the aft hanger wall 324, the first segment 344 is located within the hanger attachment opening 338 and defines the interference fit 340 with the aft hanger wall 324. The shoulder 342 at the location between the first segment 344 and the second segment 346 contacts the aft hanger wall 324 and, as noted above, may prevent the second segment 346 of the first member 332 from being inserted through the hanger attachment opening 338. The second segment 346 extends beyond the aft hanger wall 324.

Referring still to FIG. 4, the first member 332 defines a hollow core 354. The second member 334 extends through the hollow core 354 of the first member 332, and more specifically extends between a first end 356 and a second end 358.

The second member 334 includes a body having a rim 360 at the first end 356, a secondary attachment member 362 at the second end 358 and a body 364 extending at least between the rim 360 and the secondary attachment member 362. The secondary attachment member 362 is positioned outside the cavity 316 defined between the forward shroud wall 312 and aft shroud wall 314.

The rim 360 of the second member 334 may prevent the second member 334 from extending all the way through the hollow core 354 (in a direction from left to right in the view of the embodiment of FIG. 4 depicted). More specifically, for the embodiment shown, the rim 360 defines a rim diameter 366 and the hollow core 354 of the first member 332 defines a hollow core diameter 368. For the embodiment shown, the rim diameter 366 is greater than the hollow core diameter 368 to prevent the second member 334 from extending all the way through the hollow core 354 of the first member 332.

Moreover, for the embodiment shown, the rim 360 further defines an inner surface 370. The inner surface 370 of the rim 360 is positioned against the aft hanger wall 324 at a location around the hanger attachment opening 338, on a side opposite the side of the aft hanger wall 324 positioned adjacent to the aft shroud wall 314. Such may further prevent the second attachment pin assembly 330B from sliding through the hanger attachment opening 338 in a direction from left to right in the view of the embodiment of FIG. 4 depicted.

Moreover, in order to prevent the second member 334 of the second attachment pin assembly 330B from sliding in a direction from right to left in the view of the embodiment of FIG. 4 depicted, the secondary attachment member 362 is provided at the second end 358 of the second member 334. In the embodiment shown, the secondary attachment member 362 is positioned against an end of the first member 332. More specifically, the first member 332 similarly extends along the longitudinal direction between a first end 372 and a second end 374, and for the embodiment shown, the secondary attachment member 362 is positioned against the second end 374 of the first member 332. More specifically, for the embodiment shown, the hollow core 354, as noted, defines the hollow core diameter 368. The secondary attachment member 362 similarly defines a secondary attachment member diameter 376 greater than the hollow core diameter 368. The secondary attachment member 362 having a diameter 376 greater than the hollow core diameter 368 may prevent the second member 334 of the second attachment pin assembly 330B from sliding out the first and of the first member 332 (i.e., in a direction from right to left in the view of the embodiment of FIG. 4).

Notably, in the embodiment depicted, the secondary attachment member diameter 376 is less than the second segment diameter 350. Such a configuration may ensure the aft shroud wall 314 may move relative to the aft hanger wall 324 in a desired manner, as described in more detail below.

More specifically, the second member 334 of the attachment assembly further includes the body 364, with the secondary attachment member 362 coupled to the body 364 at the second end 358 of the second member 334. The secondary attachment member 362 may be coupled to the body 364 in any suitable manner. For example, in at least certain exemplary embodiments, the secondary attachment member 362 may include a swaged connection, a weld connection (e.g., a tack weld connection), a rotational engagement connection (e.g., a threaded connection), or a combination thereof. Further, the secondary attachment member 362 may include a grommet, a rotational fastener (e.g., having a threaded connector), or a combination thereof having one or more of the above connections. More specifically, for the embodiment shown the secondary attachment member 362 includes a grommet welded to the body 364 of the second member 334 of the second attachment pin assembly 330B (i.e., including a weld connection).

In such a manner, it will be appreciated that the second attachment pin assembly 330B includes at least two attachment means for coupling to the aft shroud wall 314 and aft hanger wall 324. More specifically, with respect to the first member 332, the first segment 344 of the first member 332 defines the interference fit 340 with the aft hanger wall 324 through the hanger attachment opening 338, coupling the first member 332 to the aft hanger wall 324. Notably, with respect to the first member 332, the shoulder 342 of the first member 332 prevents an over-insertion of the first member 332 into the hanger attachment opening 338 or through the hanger attachment opening 338. Further, the second member 334 of the second attachment pin assembly 330B provides the redundant coupling for the second attachment pin assembly 330B. More specifically, the second member 334 is fixed to the first member 332 through inclusion of the rim 360 defining the rim diameter 366 greater than the hollow core diameter 368 (preventing the second member 334 from sliding through the second end 358 of the first member 332), and further through inclusion of the secondary attachment member 362 (preventing the second member 334 from sliding through the first and of the first member 332). Further, the second member 334 prevents the second attachment pin assembly 330B, and more specifically, the first member 332 of the second attachment pin assembly 330B, from sliding out of the hanger attachment opening 338 of the aft hanger wall 324 through inclusion of the rim 360 defining the rim diameter 366 greater than the hanger attachment opening diameter 352.

In such a manner, the second attachment pin assembly 330B may define a dual/redundant attachment mechanism to the hanger wall 324—e.g., for the embodiment depicted (1) the interference fit 340, and (2) the combination of the shoulder 342 and rim 360 (held in place with the secondary attachment member 362).

Notably, in order to install the second attachment pin assembly 330B, the first member 332 may be installed first by press fitting the first segment 344 into the hanger attachment opening 338 (in a direction from right to left in the view depicted in FIG. 4), until the shoulder 342 is pressed against a side of the aft hanger wall 324 adjacent the aft shroud wall 314. Next, the second end 358 of the second member 334 may be slid through the hollow core 354, starting at the first end 372 of the first member 332 (in a direction from left to right), until the rim 360 is pressed against the first end 372 of the first member 332, the side of the aft hanger wall 324 opposite the side adjacent the aft shroud wall 314, or both. The secondary attachment member 362 may then be positioned over the second end 358 of the second member 334 and fixed to the body 364 of the second member 334.

Referring still to FIG. 4, as briefly mentioned above, the hanger assembly 304 may be formed of metal material and shroud segment 302 (see FIG. 3), including the aft shroud wall 314, may be formed of a ceramic matrix composite material. In such a manner, the second attachment pin assembly 330B may be required to accommodate relative thermal expansion between the shroud segment 302 and the hanger assembly 304. More specifically, in such a manner, it will be appreciated that the second attachment pin assembly 330B is configured to provide for alignment of the shroud segment 302 relative to the hanger assembly 304, but is not configured to rigidly fix the shroud segment 302 to the hanger assembly 304. More particularly, for the embodiment shown, the first member 332 defines a gap 378 with the aft shroud wall 314 within the shroud attachment opening 336. More specifically, the shroud attachment opening 336 defines a shroud attachment opening diameter 380 and the second segment 346 of the first member 332 defines a second segment diameter 350. The second segment diameter 350 is less than the shroud attachment opening diameter 380 to define the gap 378 between the first member 332 and the shroud segment 302.

Further, it will be appreciated that for the embodiment of FIG. 4, the second attachment pin assembly 330B may be configured to match or substantially match a thermal expansion of the aft hanger wall 324 to maintain, e.g., the interference fit 340 between the first member 332 and the aft hanger wall 324 through the hanger attachment opening 338. For example, the first member 332 of the second attachment pin assembly 330B and the second member 334 of the second attachment pin assembly 330B may be formed of a metal material. In at least certain exemplary aspects, the aft hanger wall 324 of the hanger assembly 304, the first member 332 of the second attachment pin assembly 330B, and the second member 334 of the second attachment pin assembly 330B may each be formed of a first metal material. In such a manner, the aft hanger wall 324 of the hanger assembly 304, the first member 332 of the second attachment pin assembly 330B, and the second member 334 of the second attachment pin assembly 330B may each be formed of a common metal material (which, as used herein, refers to the components noted being formed of the same metal material). In such a manner, the second attachment pin assembly 330B may be configured to match a thermal expansion of the aft hanger wall 324 during operation of the gas turbine engine. Further, by forming the first member 332 and the second member 334 of the second attachment pin assembly 330B of the common metal material, a fit of the first member 332 and second member 334 of the second attachment pin assembly 330B may be maintained across an operating temperature range of the second attachment pin assembly 330B, e.g., along a length of the second attachment pin assembly 330B (i.e., along the longitudinal axis 331).

Alternatively, however, it will be appreciated that the second attachment pin assembly 330B may be formed of a different metal material than the aft hanger wall 324, and additionally or alternatively, still, the first member 332 and the second member 334 of the second attachment pin assembly 330B may be formed of different metal materials. For example, in certain exemplary embodiments, the first member 332 of the second attachment pin assembly 330B may be formed of a first metal material defining a first coefficient of thermal expansion, the second member 334 of the second attachment pin assembly 330B may be formed of a second metal material defining a second coefficient of thermal expansion, and the hanger wall may be formed of a third metal material defining a third coefficient of thermal expansion.

In one exemplary embodiment, the first metal material may be different than the second metal material and the first coefficient of thermal expansion may be greater than the second coefficient of thermal expansion. In such a manner, the second attachment pin assembly 330B may maintain a desired tight fit between the first member 332 and the second member 334 along the longitudinal axis 331 of the second attachment pin assembly 330B, across an operating temperature range of the second attachment pin assembly 330B.

Further, in another exemplary embodiment, the first coefficient of thermal expansion may be greater than the third coefficient of thermal expansion. In such a manner, the first member 332 of the second attachment pin assembly 330B may maintain the interference fit 340 with the aft hanger wall 324 through the hanger attachment opening 338 across an operating temperature range of the second attachment pin assembly 330B.

Figure 5:
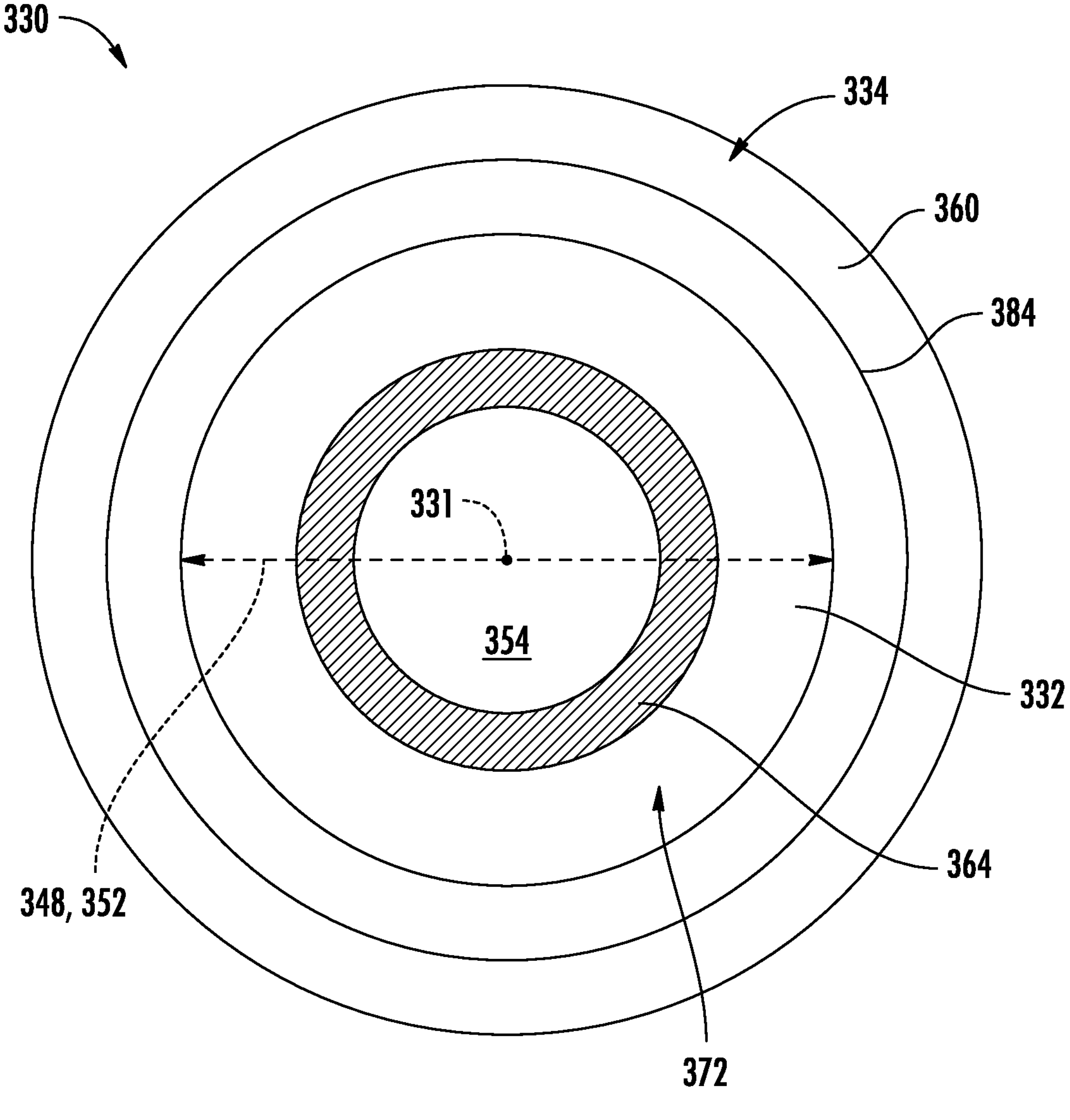
FIG. 5 is view along a longitudinal centerline of the attachment pin assembly of FIG. 4.

As briefly discussed above, it will be appreciated that the shroud assembly 300 (see FIG. 3) may maintain a pressure differential between the hollow core 354 defined by the shroud segment 302 and a cavity forward of the shroud segment 302 and/or aft of the shroud segment 302. Notably, however, the second member 334, or rather, the body 364 of the second member 334, defines a gap 382 with the first member 332 within the hollow core 354. The gap 382 may allow for, e.g., relative thermal expansion or the like. However, with such a configuration, in order to maintain a fluid seal between the second attachment pin assembly 330B and the aft hanger wall 324, the rim 360 of the second member 334 includes a sealing element 384 (see FIG. 5) configured to contact the aft hanger wall 324 around the hanger attachment opening 338. More specifically, referring now also to FIG. 5, a schematic, cross-sectional view of the first end 356 of the first member 332 and the first end 356 of the second member 334, at an interface between the rim 360 and the first end 356 of the first member 332 is provided. The aft hanger wall 324 is not included in the view of FIG. 5. As is shown, the sealing element 384 is a circumferential sealing element positioned on the inner surface 370 of the rim 360 at a location outward of the first segment diameter 348 of the first segment 344 of the first member 332. In such a manner, the rim 360 of the second member 334 may form a fluid tight seal with the aft hanger wall 324 on a side of the aft hanger wall 324 side opposite a side facing the aft shroud wall 314.

Referring back briefly to FIG. 3, it will be appreciated that the second attachment pin assembly 330B discussed above with reference to FIGS. 4 and 5 is configured to attach the aft hanger wall 324 to the aft shroud wall 314. In the embodiment shown, it will be appreciated that the shroud assembly 300 further includes the first attachment pin assembly 330A, as briefly noted above. The first attachment pin assembly 330A may be configured to attach the forward hanger wall 322 to the forward shroud wall 312. The first attachment pin assembly 330A may be configured in substantially the same manner as the second attachment pin assembly 330B.

In such a manner, an attachment pin assembly of the present disclosure may include a dual attachment configuration with less complexity and weight than previous designs. For example, the attachment pin assembly includes a first attachment through the interference fit between the first member and the hanger wall, and a second attachment through a compression between the shoulder of the first member and the rim of the second member (held in position by a secondary attachment member). Notably, such may also facilitate a simpler installation process by allowing a rim of the second member to position a cavity defined between forward and aft shroud walls, where access may be difficult during installation.

In addition, it will be appreciated that the present disclosure provides for a method of attaching a shroud segment to a shroud hanger. The method may be utilized with one or more of the exemplary embodiments described hereinabove.

The method includes positioning a first member of an attachment pin assembly into a hanger attachment opening of a hanger wall and into a shroud attachment opening of a shroud wall. In at least certain exemplary aspects, positioning the first member into the hanger attachment opening includes press fitting the first member into the hanger attachment opening. In such a manner, the first member may define an interference fit with the hanger wall through the hanger attachment opening.

Further, it will be appreciated that in certain exemplary aspects, positioning the first member into the hanger attachment opening may further include positioning a shoulder of the first member against the hanger wall.

The method further includes positioning a second member through a hollow core of the first member. Positioning the second member through the hollow core of the first member may include positioning a rim of the first member located at a first end of the first member against the hanger wall. Notably, in at least certain exemplary aspects, positioning the second member through the hollow core comprises sealing the rim of the first member with the hanger wall (e.g., by pressing a sealing element on the rim against the hanger wall).

The method further includes attaching a secondary attachment member to a second end of the first member. Attaching the secondary attachment member to the second end of the first member may include swaging, welding, rotatably engaging, or the like the secondary attachment member to the second end of the first member.

Further aspects are provided by the subject matter of the following clauses:

A shroud assembly for a gas turbine engine, the shroud assembly comprising: a shroud segment extending substantially along a circumferential direction and comprising a shroud wall, the shroud wall defining a shroud attachment opening; a hanger assembly comprising a hanger wall defining a hanger attachment opening; and an attachment pin assembly, comprising a first member comprising a first body defining a hollow core and having a first portion provided within the hanger attachment opening and defining an interference fit between the first portion and the hanger wall, the first body further comprising a shoulder contacting the hanger wall, the first body further extending through the shroud attachment opening; a second member comprising a second body extending between a first end and a second end and including a rim at the first end, the second body extending through the hollow core of the first member; and a secondary attachment member provided with the second body and adapted to retain the second body within the first body.

The shroud assembly of any preceding clause, wherein the first body includes a first segment having a first segment diameter and the shoulder has a width larger than the first segment diameter.

The shroud assembly of any preceding clause, wherein the first member includes a first segment and a second segment, wherein the first segment defines the interference fit with the hanger wall through the hanger attachment opening and wherein the second segment extends through the shroud attachment opening, wherein the first segment of the first member defines a first segment diameter, and wherein the rim of the second member defines a rim diameter greater than the first segment diameter.

The shroud assembly of any preceding clause, wherein the rim defines an inner surface, wherein the inner surface comprises a circumferential seal element positioned at a location outward of the first segment diameter.

The shroud assembly of any preceding clause, wherein the rim of the second member defines a rim diameter greater than the first segment diameter and the rim is positioned against the hanger wall.

The shroud assembly of any preceding clause, wherein the rim of the second body defines a rim diameter greater than the first segment diameter.

The shroud assembly of any preceding clause, wherein the secondary attachment member is positioned against a second distal end of the first member.

The shroud assembly of any preceding clause, wherein the hollow core defines a hollow core diameter, wherein the secondary attachment member defines a secondary attachment member diameter greater than the hollow core diameter.

The shroud assembly of any preceding clause, wherein the secondary attachment member comprises a swaged connection, a weld connection, a rotational engagement connection, or a combination thereof.

The shroud assembly of any preceding clause, wherein the secondary attachment member comprises a grommet, a rotational fastener, or both.

The shroud assembly of any preceding clause, wherein the shroud segment is formed of a ceramic matrix composite material, and wherein the hanger assembly, the first member of the attachment pin assembly, and the second member of the attachment pin assembly are formed of a metal material.

The shroud assembly of any preceding clause, wherein the hanger wall, the first member of the attachment pin assembly, and the second member of the attachment pin assembly are each formed of a first metal material.

The shroud assembly of any preceding clause, wherein the first member and the second member of the attachment pin assembly are each formed of a first metal material.

The shroud assembly of any preceding clause, wherein the first member of the attachment pin assembly is formed of a first metal material defining a first coefficient of thermal expansion, wherein the second member of the attachment pin assembly is formed of a second metal material defining a second coefficient of thermal expansion, and wherein the first coefficient of thermal expansion is greater than the second coefficient of thermal expansion.

The shroud assembly of any preceding clause, wherein the first member defines a gap with the shroud segment within the shroud attachment opening.

The shroud assembly of any preceding clause, wherein the secondary attachment member comprises a body extending through the hollow core of the first member, and wherein the body defines a gap with the first member within the hollow core.

The shroud assembly of any preceding clause, wherein the gas turbine engine comprises a turbine section, and wherein the shroud segment is configured to be positioned within the turbine section.

An attachment pin assembly, comprising a first member comprising a first body defining a hollow core having a first portion adapted to be provided within a hanger attachment opening in a hanger wall and interference fit with the hanger wall, the first body further comprising a shoulder, the first member further adapted to extend through a shroud attachment opening of a shroud wall; and a second member comprising a second body extending between a first end and a second end and including a rim at the first end; when assembled the second body extending through the hollow core of the first member and a secondary attachment member provided with the second body and adapted to retain the second body within the first body.

The attachment pin assembly of any preceding clause, wherein the first body includes a first segment having a first segment diameter and the shoulder has a width larger than the first segment diameter.

The attachment pin assembly of any preceding clause, wherein the first member includes a first segment and a second segment, wherein the first segment defines the interference fit with the hanger wall through the hanger attachment opening and wherein the second segment extends through the shroud attachment opening, wherein the first segment of the first member defines a first segment diameter, and wherein the rim of the second member defines a rim diameter greater than the first segment diameter.

The attachment pin assembly of any preceding clause, wherein the secondary attachment member is positioned against a second distal end of the first member.

The attachment pin assembly of any preceding clause, wherein the first member of the attachment pin assembly is formed of a first metal material defining a first coefficient of thermal expansion, wherein the second member of the attachment pin assembly is formed of a second metal material defining a second coefficient of thermal expansion, and wherein the first coefficient of thermal expansion is greater than the second coefficient of thermal expansion.

A gas turbine engine defining an axial direction, a radial direction, and a circumferential direction, comprising: a compressor section, a combustion section, and a turbine section in serial flow relationship and together defining a working gas flowpath; and a shroud assembly positioned within at least one of the compressor section or the turbine section and at least partially defining the working gas flowpath, the shroud assembly comprising a shroud segment extending substantially along the circumferential direction and comprising a shroud wall, the shroud wall defining a shroud attachment opening; a hanger assembly comprising a hanger wall defining a hanger attachment opening; and an attachment pin assembly comprising a first member defining an interference fit with the hanger wall through the hanger attachment opening and comprising a shoulder contacting the hanger wall, the first member further extending through the shroud attachment opening and defining a hollow core; and a second member extending through the hollow core of the first member, the second member extending between a first end and a second end, the second member including a rim at the first end and a secondary attachment member at the second end.

A method of attaching a shroud segment to a shroud hanger, the method comprising: positioning a first member of an attachment pin assembly into a hanger attachment opening of a hanger wall and into a shroud attachment opening of a shroud wall, wherein positioning the first member into the hanger attachment opening comprises press fitting the first member into the hanger attachment opening; positioning a second member through a hollow core of the first member, wherein positioning the second member through the hollow core comprises positioning a rim of the first member located at a first end of the first member against the hanger wall; and attaching a secondary attachment member to a second end of the first member.

The method of one or more of the preceding clauses, wherein positioning the first member into the hanger attachment opening further comprises positioning a shoulder of the first member against the hanger wall.

The method of one or more of the preceding clauses, wherein positioning the second member through the hollow core comprises sealing the rim of the first member with the hanger wall.

The method of one or more of the preceding clauses, wherein the hollow core defines a hollow core diameter, wherein the secondary attachment member defines a secondary attachment member diameter greater than the hollow core diameter.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. An attachment pin assembly comprising:

a first member comprising a first body defining a hollow core having a first portion provided within a hanger attachment opening in a hanger wall and defining an interference fit between the first portion and the hanger wall, the first body further comprising a shoulder abutting the hanger wall, the first member further extending through a shroud attachment opening of a shroud wall; and a second member comprising a second body extending between a first end and a second end and including a rim at the first end;

when assembled, the second body extending through the hollow core of the first member and a secondary attachment member provided with the second body and retaining the second body within the first body.

2. The attachment pin assembly of claim 1, wherein the first body includes a first segment having a first segment diameter and the shoulder has a width larger than the first segment diameter.

3. The attachment pin assembly of claim 2, wherein the rim defines an inner surface, wherein the inner surface comprises a circumferential seal element positioned at a location outward of the first segment diameter.

4. The attachment pin assembly of claim 2, wherein the rim of the second member defines a rim diameter greater than the first segment diameter and the rim is positioned against the hanger wall.

5. The attachment pin assembly of claim 2, wherein the rim of the second body defines a rim diameter greater than the first segment diameter.

6. The attachment pin assembly of claim 1, wherein the secondary attachment member is positioned against a second distal end of the first member.

7. The attachment pin assembly of claim 1, wherein the hollow core defines a hollow core diameter, wherein the secondary attachment member defines a secondary attachment member diameter greater than the hollow core diameter.

8. The attachment pin assembly of claim 1, wherein the secondary attachment member comprises a swaged connection, a weld connection, a rotational engagement connection, a grommet, a rotational fastener, or a combination thereof.

9. The attachment pin assembly of claim 1, wherein the first member of the attachment pin assembly is formed of a first metal material defining a first coefficient of thermal expansion, wherein the second member of the attachment pin assembly is formed of a second metal material defining a second coefficient of thermal expansion, and wherein the first coefficient of thermal expansion is greater than the second coefficient of thermal expansion.

10. The attachment pin assembly of claim 1, wherein the secondary attachment member comprises a body extending through the hollow core of the first member, and wherein the body defines a gap with the first member within the hollow core.

11. The attachment pin assembly of claim 1, wherein the first body includes a first segment and a second segment with the shoulder located between the first segment and the second segment, wherein the first body extends between a first end and a second end along a length of the first body, wherein the first segment is located at the first end and the second segment is located at the second end, wherein the first segment defines a first segment diameter, wherein the shoulder defines a width larger than the first segment diameter.

12. The attachment pin assembly of claim 11, wherein the first body is formed integrally as a monolithic component.

13. An attachment pin assembly comprising:

a first member comprising a first body defining a hollow core having a first portion provided within a hanger attachment opening in a hanger wall and defining an interference fit between the first portion and the hanger wall, the first body further comprising a shoulder abutting the hanger wall; and a second member comprising a second body extending between a first end and a second end and including a rim at the first end;

when assembled, the second body extending through the hollow core of the first member and the second end of the second member extending out from the hollow core.

14. The attachment pin assembly of claim 13, further comprising a secondary attachment member provided with the second body and retaining the second body within the first body.

15. The attachment pin assembly of claim 13, wherein the rim of the second member further comprises a sealing element configured to form a fluid tight seal with the hanger wall.

16. The attachment pin assembly of claim 13, wherein the first member of the attachment pin assembly is formed of a first metal material defining a first coefficient of thermal expansion, wherein the second member of the attachment pin assembly is formed of a second metal material defining a second coefficient of thermal expansion, and wherein the first coefficient of thermal expansion is greater than the second coefficient of thermal expansion.

17. The attachment pin assembly of claim 13, wherein the first member of the attachment pin assembly is formed of a first metal material defining a first coefficient of thermal expansion configured to match a thermal expansion of the hanger wall.

18. The attachment pin assembly of claim 13, wherein the first body includes a first segment and a second segment with the shoulder located between the first segment and the second segment, wherein the first body extends between a first end and a second end along a length of the first body, wherein the first segment is located at the first end and the second segment is located at the second end, wherein the first segment defines a first segment diameter, wherein the shoulder defines a width larger than the first segment diameter.

19. The attachment pin assembly of claim 18, wherein the first body is formed integrally as a monolithic component.

20. A method of attaching a shroud segment to a shroud hanger, the method comprising:

positioning a first member of an attachment pin assembly into a hanger attachment opening of a hanger wall and into a shroud attachment opening of a shroud wall, wherein positioning the first member into the hanger attachment opening comprises press fitting the first member into the hanger attachment opening;

positioning a second member through a hollow core of the first member, wherein positioning the second member through the hollow core comprises positioning a rim of the first member located at a first end of the first member against the hanger wall; and attaching a secondary attachment member to a second end of the first member.

* * * * *